Aug. 27, 1968    R. H. McFARLAND    3,398,582
METHOD FOR MEASUREMENT OF VACUUM PRESSURE
Filed July 25, 1966
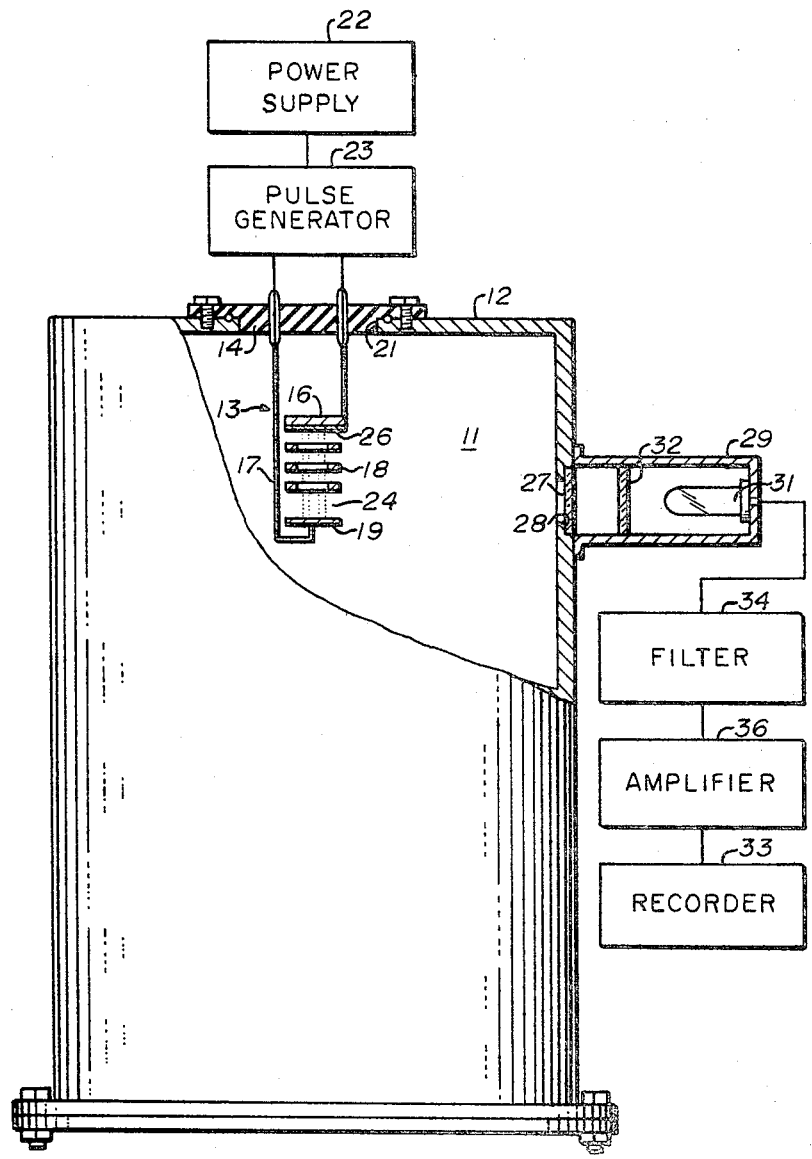
INVENTOR.
ROBERT H. MCFARLAND
BY
ATTORNEY

United States Patent Office 3,398,582
Patented Aug. 27, 1968

3,398,582
METHOD FOR MEASUREMENT OF
VACUUM PRESSURE
Robert H. McFarland, Livermore, Calif., assignor to the United States of America as represented by the United States Atomic Energy Commission
Continuation-in-part of application Ser. No. 200,587, June 6, 1962. This application July 25, 1966, Ser. No. 569,555
6 Claims. (Cl. 73—398)

ABSTRACT OF THE DISCLOSURE

A pressure indicating system wherein the light quanta produced by electron-beam interaction with gas atoms in a high-vacuum environment is sensed by a photoelectric conversion device to produce an electrical output signal indicative of the gas atoms in said environment.

---

The present application is a continuation-in-part application of my co-pending patent application S.N. 200,587, filed June 6, 1962, now abandoned, and incorporates the subject matter thereof.

The present invention was evolved in the course of, or under, Contract No. W-7405-ENG-48 with the United States Atomic Energy Commission.

This invention relates to high-vacuum pressure gauges and, more particularly, to a method and means for measuring pressure wherein the light quanta produced by interaction of an electron beam with gas atoms of a high-vacuum system are utilized as an extremely sensitive indication of the pressure therein.

Expanding vacuum technology and research has resulted in a need for superior vacuum gauges. Prior vacuum gauges are essentially limited to pressures higher than $10^{-9}$ mm. Hg. This is especially evident in the ionization-type gauges presently utilized in the high-vacuum laboratory. Ionization gauges all have the common feature of measuring an ionization current that is proportional for any one gas to the gas molecular concentration. Although different types of ionization gauges are possible, these gauges vary only in the manner of forming positive ions and in the manner of collecting these ions. Therefore, such gauges are limited to the smallest ion current detectable in the presence of photoemission from the ionization-gauge collector-electrode. As the change in ion-current reading becomes negligible at lower vacuum pressures of the order of $10^{-9}$ mm. Hg, it is evident that a more sensitive type of vacuum gauge is required for higher vacuum systems.

The present invention provides a pressure-measuring method and apparatus which are extremely sensitive under very high vacuum condition of $10^{-9}$ mm. Hg and lower pressures. The invention does not depend upon the formation and detection of an ion current as an indication of pressure. Instead, the pressure-indicating medium employed in the present instance is the light quanta produced by electron-beam interaction with gas atoms of a vacuum system. The light quanta produced is proportional to the gas atoms of the system. Such light quanta may be readily detected by photoelectric conversion means as an electrical signal.

However, for the purposes of the present invention, the energy range of the electron beam must be limited to a relatively narrow energy range. The lower limit of this range is, of course, the energy corresponding to the lowest excitation potential of the gas particles, which depends primarily upon the nature of the gas components. These values are readily established by referring to a table of spectral emission of the elements in the optical region of the spectrum, cf. Charlotte E. Moore "Atomic Energy Levels," vols. I, II, III, Circular of the National Bureau of Standards (467), 1949.

The uppermost limit is generally determined by the electron-gas particle interaction cross section, which drops off rapidly for electrons in the region corresponding to about 100–150 ev., and for some atoms and molecules at energies below 50 ev. This uppermost limit varies somewhat from element to element. A variety of cross sections are given in the reference work of Massey and Burhop, Electronic and Ionic Impact Phenomena, University Press, Oxford, 1952, pages 55 ff.

Although electron beams of energies as high as 100 ev. may be usable under certain circumstances, it is generally mandatory to reduce the electron beam energy to a value as low as possible within the energy range within which the cross section for radiative electron-gas particle interaction is high. The reasons therefore are manifold. In the present case of ultra vacuum pressure measurement, it is essential that the interaction of the electron beam with the vacuum chamber walls be minimized, since this interaction gives rise to radiations which interfere with the precise pressure determination. Since gases at such low pressure have virtually no attenuation power with respect to high energy electrons, this can only be achieved by reducing the electron beam energy to as low a value as possible.

Furthermore, as mentioned supra, it is contemplated to utilize the present device and process for simultaneous analysis and partial pressure determinations of the gas components by line radiation analysis. In view of the generally more profuse nature of the higher energy levels of molecules and line radiation issuing from their decay, the analysis of the gas for individual components becomes considerably more complicated if high energy electrons are utilized. As a result, the utilization of optical filters becomes impractical or impossible, and resort must be had to less desirable spectroscopic methods.

Finally, in many applications, the generation of ions is not desired. This can only be avoided if the energy of the electron is kept below the ionization potential of the gas components.

Accordingly, this invention has no apparent limitations in sensitivity at $10^{-9}$ mm. Hg and lower pressures. In addition, the invention has the advantage of being capable of partial pressure measurements of individual gases as contained within a gas mixture to be analyzed. Another advantage is that the invention may be satisfactorily used within vacuum systems wherein high magnetic fields exist, e.g., in plasma mirror-machines, stellerators, and ion machines. Previous ionization gauges could be affected by nearby magnetic fields which interfered with ion-current collection; the use of these gauges within vacuum systems in the presence of magnetic fields was not always possible.

It is a principal object of this invention to provide for the detection of pressure by the employment of an electron beam for the excitation of gas atoms with a resultant release of a measurable quantity of light proportional to the gas pressure present.

It is another object of the invention to provide a method and means for vacuum-pressure measurements in vacuum systems having pressure below $10^{-9}$ mm. Hg.

It is still another object of the invention to provide spectrographic analysis of the individual elements comprising a gas mixture, and to provide partial pressure measurements of the same.

It is still another object of the invention to provide a vacuum-pressure gauge for use within vacuum systems in the presence of magnetic fields.

With this brief identification of the features of this invention, the invention may be fully understood by reference to the following description and the accompanying drawing, wherein the single figure is a schematic diagram illustrating the basic principles, a preferred embodiment, and specific refinements of the invention.

Referring now to the drawing, there is shown a gas vacuum system 11 defined by a housing 12. The pressure of system 11 is measured in accordance with the present invention by first exciting gas atoms within the system by electron interaction therewith. In this regard, an electron beam may be passed though a limited region of the system, the beam electrons in traversing the region interacting with a representative portion of the gas atoms in the system. As a result, light quanta (photons) are produced in proportion to the number of excited gas atoms in the system which, in turn, is proportional to the number of gas atoms per cubic centimeter of the system and, therefore, the pressure therein. Accordingly, the light quanta are observed as a function of system pressure. Such obsrevation may be variously accomplished as by converting the light quanta to a proportional electrical signal and recording the signal as an indication of pressure.

In some instances, it is desirable to perform a spectrographic analysis of the gas in the system, and to provide partial pressure measurements where a mixture of gases exist in the system. This is readily accomplished in accordance with the general method outlined above by the additional step of filtering the light quanta to limit that observed, to predetermined spectral wavelengths. The amount of observed light of the various predetermined wavelengths indicates the partial pressures of gases in the system which have corresponding spectrums.

Although the method of the invention may be variously conducted, one particular embodiment of gauge means therefor is next considered. Such gauge includes an electron gun 13 mounted within vacuum system 11 and comprising an electron-tube mounting 14, a cathode 16, and an anode structure 17, having a series of annular beam collimators 18 and anode 19. The electron gun is supported by securing tube mounting 14 within a hermetically sealed slot 21 in housing 12. The electron gun is externally connected to power supply 22 through a pulse generator 23. The spacing between anode 19 and the adjacent collimator 18 defines an excitation region 24 exposed to the gas of the system. The electron gun structure may be advantageously constructed of stainless steel, and the cathode coating 26 is preferably an activated compound of barium, strontium, and calcium carbonate.

It should be noted that in view of the lack of a suitable material for providing an ultra vacuum-tight window which is transparent to low energy electrons without undue scattering, it is essential to dispose the electron gun as well as electron accelerating components directly within the vacuum chamber where the electrons have a free path to promote interaction with gas particles.

A viewing window 27 is inserted within another hermetically sealed slot 28 of housing 12. The window is in alignment with electron-beam region 24. A photomultiplier casing 29, including a photomultiplier tube 31, is mounted against housing 12 at window 27 such that tube 31 is disposed to receive light quanta from region 24. An optical filter 32 for distinguishing a single spectral light wavelength may be inserted into casing 29 spaced between tube 31 and viewing window 27. Photomultiplier tube 31, in turn, is connected to a recorder 33 through an electrical filter 34 and amplifier 36.

In operation, power supply 22 activates electron gun 13, creating an electron beam extending from cathode 16 to anode 19 through the set of focusing collimators 18. The beam in excitation region 24 produces light quanta resulting from the electron interaction with gas atoms present within the vacuum system. This light, in turn, is viewed by photomultiplier tube 31 through window 27 of housing 12. The incident light on photomultiplier tube 31 is converted into an electrical output signal which is conducted to amplifier 36, wherein the intensity of the amplified signal is read by recorder 33. It is to be noted that the eelctron beam is preferably pulsed in order that electrical noise or shot effects may be filtered from the output signal; therefore, a pulse generator 23 is shown included between power supply 22 and electron gun 13, and a filter network 34 is provided between tube 31 and amplifier 36. Where optical filters 32, passive to predemined spectral wavelengths, are inserted in photomultiplier casing 29, the corresponding output signals provide spectral analysis of specific gases within the vacuum system. The use of several optical filters to pass light of various wavelengths to photomultiplier 31 enables a spectrographic analysis of the gas system as well as measurements in partial pressure.

In the above embodiment, the light intensity received by the photomultiplier tube for recording is directly proportional to the number of excited atoms within the gas in the following manner:

$$n_x \alpha I_0 L \bar{\delta}_x N$$

where $n$ is the light intensity in terms of the number of excited gas atoms giving rise to the light observed by the photomultiplier tube, $x$ is a reference subscript for individual gases, $I_0$ is the electron-beam current, $L$ is the length of the excitation region viewed by the photomultiplier tube, $\bar{\delta}$ is the effective cross section for electron-gas collision, and $N$ is the number of gas atoms per cubic centimeter.

In the foregoing, the number of excited atoms, $n$, is linearly proportional to $N$ which, in turn, is proportional to the contained gas pressure of the vacuum system. The above equation may be used to calibrate the device of this invention by the use of a known gas where $n_x$ may be found for calibration purposes from known values of $I_0$, $L$, $\bar{\delta}_x$, and $N$, prior to use with gas of unknown pressure and unknown value $N$.

Obviously, many modifications and variations of the invention, as hereinbefore set forth, may be made without departing from the spirit and scope thereof, and thereof, and therefore, this invention is to be limited only by the following claims.

What is claimed is:

1. In a process for measuring the pressure of a gas contained within an evacuated system under very high vacuum conditions, the steps comprising:
    (a) causing electrons to traverse a limited free path region within said evacuated system,
    (b) accelerating said electrons to an energy corresponding to an enhanced electron-gas particle interaction cross section within the energy range between a lower limit equal to the lowest excitation potential from the ground state of said gas, and an upper limit between about 100 and 150 electron volts, whereby said gas particles are caused to emit light photons from said gas atoms,
    (c) intercepting said light photons by disposing photoelectric conversion means in the path of said photons, said photoelectric conversion means being responsive to said light photons emitted by said gas atoms to produce an electrical signal which is proportional to the intensity of said photons, and
    (d) measuring the intensity of said electrical signal as a measure of the pressure of said gas.

2. The process of claim 1, further defined in that the equipment for carrying out said process is first calibrated by:
    (a) introducing a known gas of a known pressure into said evacuated system,
    (b) injecting electrons into a region within said evacuated system,
    (c) accelerating said electrons to an energy between the lowest excitation potential of said gas and about 100–150 electron volts to excite said known gas atoms and cause the emission of light photons therefrom,
(d) disposing said photoelectric conversion means in the path of said emitted photons from said known gas atoms, and
(e) measuring the intensity of said electrical signal as a calibration measure corresponding to said known pressure of said known gas component.

3. The process of claim 1, further defined in that said upper energy limit is 50 electron volts.

4. The process of claim 1, further defined in that said upper energy limit is equal to the ionization potential of said gas.

5. The process of claim 1, further defined in that said electrons are caused to traverse a limited region within said evacuated system by causing the emission of free electrons from a cathode surface disposed in the atmosphere of said system, and by collimating said electrons subsequent to emission from said cathode to pass through a said limited region of the atmosphere of said system and impinge on an anode.

6. In a process for analyzing a mixture of gases contained within an evacuated system under very high vacuum conditions, and for simultaneously measuring the partial pressures of gas components of said mixture, the steps comprising:
(a) causing the emission of free electrons at a cathode surface disposed in the atmosphere of said system,
(b) collimating said electrons to pass through a limited region of the atmosphere of said system,
(c) accelerating said electrons to an energy corresponding to an enhanced electron-gas particle interaction cross section within an energy range between a lower limit equal to the lowest excitation potential from the ground state of at least one of said gas components, and an upper limit between about 100–150 electron volts, whereby gas particles of at least one of said gas components are caused to emit light photons,
(d) intercepting said light photons by disposing photoelectric conversion means in the path of said photons, said photoelectric conversion means being responsive to said light photons emitted by said gas atoms to produce an electrical signal which is proportional to the intensity of said photons,
(e) disposing optical filter means selectively passive to photons of a preselected wavelength corresponding to at least one characteristic spectrographic line of said gas particles of said gas component in the path of said photons intermediate between said gas particles excited by said electrons and said photon detector means, and
(f) determining the magnitude of said electrical signal as a measure of the partial pressure of at least one of said gas components in the mixture in said system.

References Cited
UNITED STATES PATENTS

| | | | |
|---|---|---|---|
| 2,952,776 | 9/1960 | Schumacher et al. | 250—71 |
| 3,154,681 | 10/1964 | Ziegler | 250—43.5 |

S. CLEMENT SWISHER, *Acting Primary Examiner.*

D. O. WOODIEL, *Assistant Examiner.*